United States Patent
Fabian et al.

(10) Patent No.: US 9,944,240 B1
(45) Date of Patent: Apr. 17, 2018

(54) IRIS SEAL POWER OUTLET CLOSURE

(71) Applicant: FORD GLOBAL TECHNOLOGIES, LLC, Dearborn, MI (US)

(72) Inventors: Edgar Salazar Fabian, Cuautitlan Izcalli (MX); Jesus Guadalupe Castillo Maldonado, Cuautitlan izcalli (MX)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/287,030

(22) Filed: Oct. 6, 2016

(51) Int. Cl.
| | | |
|---|---|---|
| *B60R 16/03* | (2006.01) | |
| *H01R 13/447* | (2006.01) | |
| *H01R 24/20* | (2011.01) | |
| *B60R 13/02* | (2006.01) | |
| *B60R 11/00* | (2006.01) | |
| *H01R 103/00* | (2006.01) | |

(52) U.S. Cl.
CPC .......... *B60R 16/03* (2013.01); *B60R 13/0262* (2013.01); *H01R 13/447* (2013.01); *H01R 24/20* (2013.01); *B60R 2011/0003* (2013.01); *H01R 2103/00* (2013.01); *H01R 2201/26* (2013.01)

(58) Field of Classification Search
CPC ............... B60R 13/0262; B60R 16/03; B60R 2011/0003; H01R 13/447; H01R 24/20; H01R 2103/00; H01R 2201/26; H01R 13/453; H01R 13/4532
USPC ................................... 439/34, 135–138, 142
See application file for complete search history.

(56) References Cited

U.S. PATENT DOCUMENTS

| | | | | |
|---|---|---|---|---|
| 2,926,327 | A * | 2/1960 | Metelli | H01R 13/447 439/139 |
| 3,590,717 | A * | 7/1971 | Raab | G03B 9/07 396/460 |
| 3,621,766 | A * | 11/1971 | Giesecke | G03B 9/08 396/195 |
| 4,176,897 | A * | 12/1979 | Cameron | H01R 13/44 439/137 |
| 4,217,019 | A * | 8/1980 | Cameron | H01R 13/44 439/137 |
| 4,514,024 | A * | 4/1985 | Clark | H01R 13/65802 439/137 |
| 6,908,320 | B2 * | 6/2005 | Genduso | H01R 27/00 439/138 |

(Continued)

FOREIGN PATENT DOCUMENTS

KR          200459130 Y1          1/2011

OTHER PUBLICATIONS

English Machine Translation of KR00459130Y1.

*Primary Examiner* — Tulsidas C Patel
*Assistant Examiner* — Travis Chambers
(74) *Attorney, Agent, or Firm* — Vichit Chea; King & Schickli PLLC

(57) ABSTRACT

A power outlet seal for a vehicle includes an iris seal and an actuator knob configured to translate the iris seal between an opened configuration and a closed configuration. The iris seal is defined by a plurality of blades disposed concentrically on a base ring. The actuator knob includes an actuator ring for biasing the plurality of blades to the opened configuration. One or more resilient members are disposed to bias the plurality of blades to the closed configuration. Power outlet seal assemblies including the power outlet seal, and console or trim pieces including the power outlet seal assemblies, are disclosed.

20 Claims, 3 Drawing Sheets

(56) References Cited

U.S. PATENT DOCUMENTS

| | | | |
|---|---|---|---|
| 7,193,182 B2 | 3/2007 | Can et al. | |
| 7,819,728 B2 * | 10/2010 | Beckley | B60H 1/3407 220/822 |
| 8,545,259 B2 * | 10/2013 | Matthias | H01M 2/1055 439/500 |
| 8,905,458 B2 | 12/2014 | Pipp et al. | |
| 8,905,768 B2 * | 12/2014 | Hara | B60L 11/1818 439/136 |
| 9,096,149 B2 | 8/2015 | Schwarzbach et al. | |
| 9,493,087 B2 * | 11/2016 | Leary | B60L 11/1824 |
| 2010/0150544 A1 * | 6/2010 | Koop | G03B 9/08 396/453 |
| 2011/0132905 A1 * | 6/2011 | Ognjanovski | B60K 15/0406 220/86.2 |
| 2011/0223806 A1 * | 9/2011 | You | H01R 13/6658 439/620.22 |
| 2016/0304029 A1 * | 10/2016 | Villanueva | H04N 5/2252 |

* cited by examiner

IRIS SEAL POWER OUTLET CLOSURE

TECHNICAL FIELD

This disclosure relates generally to vehicle power outlets. More particularly, the disclosure relates to a space-saving iris seal closure for a vehicle power outlet.

BACKGROUND

Modern motor vehicle consoles, dash panels, etc. typically include a variety of power outlets. Most conventionally, such power outlets are configured as 12V outlets, although it is also known to provide other types of outlets and data ports including USB plugs, power outlets of differing voltages, and the like. Often, outlets such as powerpoint outlets are provided with hinged covers to prevent intrusion of dust and debris when the outlet is not in use. Due to the limited amount of space provided in consoles, dash panels, etc. of motor vehicles, often such hinged covers interfere with other devices or systems. This creates problems in packaging the many required and customer-requested features into the vehicle console or dash panel.

To solve this and other problems, the present disclosure relates to an iris-style closure for a power outlet which does not require a hinged covers and which further is substantially self-sealing when not in use.

SUMMARY

In accordance with the purposes and benefits described herein, in one aspect a power outlet closure for a vehicle, comprising an iris seal and an actuator knob configured to translate the iris seal between an opened configuration and a closed configuration. The iris seal comprises a plurality of blades disposed concentrically on a base ring. The actuator knob may include an actuator ring for biasing the plurality of blades to the opened configuration. One or more biasing members are provided which bias the plurality of blades to the closed configuration.

In another aspect, a power outlet seal assembly for a vehicle is provided, comprising a power outlet and a power outlet closure as described above.

In yet another aspect, a vehicle console or trim piece is provided including the power outlet seal assembly described above.

In the following description, there are shown and described embodiments of the disclosed iris seal closure for power outlet. As it should be realized, the carrier is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed iris seal closure for power outlet, and together with the description serve to explain certain principles thereof. In the drawing.

Reference will now be made in detail to embodiments of the disclosed iris seal closure for power outlet, examples of which are illustrated in the accompanying drawing figures.

DETAILED DESCRIPTION

Figure 1:
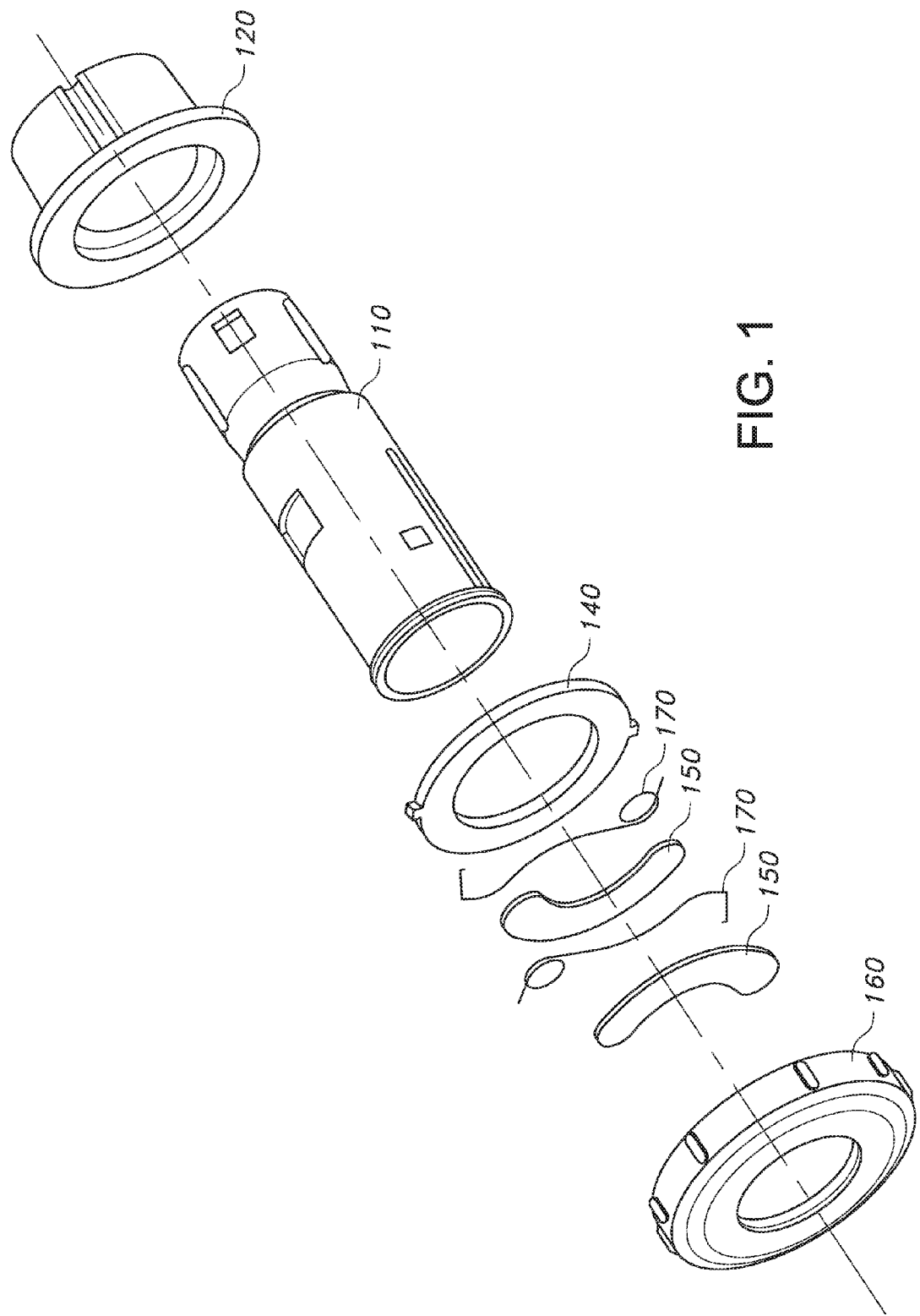
FIG. 1 depicts an exploded view of a power outlet assembly according to the present disclosure.

Turning to FIG. 1, a power outlet assembly 100 is depicted, configured for receiving therein a conventional 12V power plug as is well known in the motor vehicle arts. In the depicted embodiment, the power outlet assembly 100 includes a cylindrical power outlet socket defined by a receptacle body 110 and a holder 120. An electrical contact in electrical communication with a vehicle power source (not visible in this view) is disposed at a distal end of the receptacle body 110.

A power outlet closure 130 is provided, defined by a base ring 140 defining an interior throughbore, a plurality of blades 150, and an actuator knob 160 likewise defining an interior throughbore. One or more biasing members 170 are disposed, affixed at a first end to the base ring and at a second end to a portion of a blade, to bias the blades 150 to a closed configuration. In the depicted embodiment, the biasing members 170 are spring wires, although use of other biasing members is contemplated. In an alternative embodiment (not shown), the actuator knob 160 is used to manually open and close the plurality of blades 150 and no biasing member(s) 170 are included.

Figure 2:
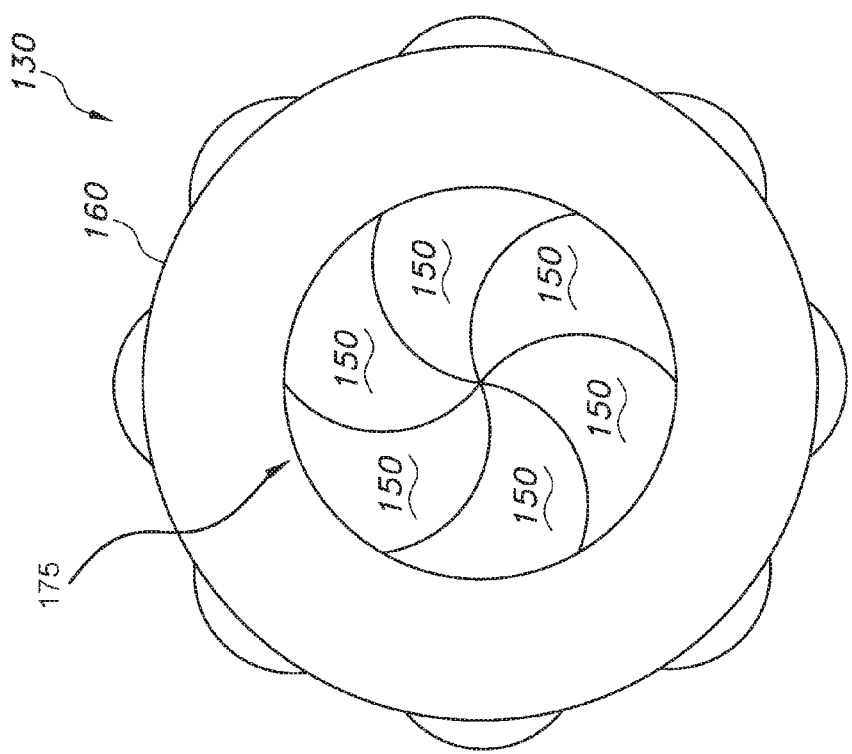
FIG. 2 depicts a top plan view of the power outlet closure of FIG. 2 in a closed configuration.

FIG. 2 is a top view of the power outlet closure 130, with the blades 150 biased to the closed configuration by action of the biasing members 170 (not visible in this view). As shown, the blades 150 define an iris-type closure or shutter seal 175 occluding the actuator knob 160 throughbore.

Figure 3:
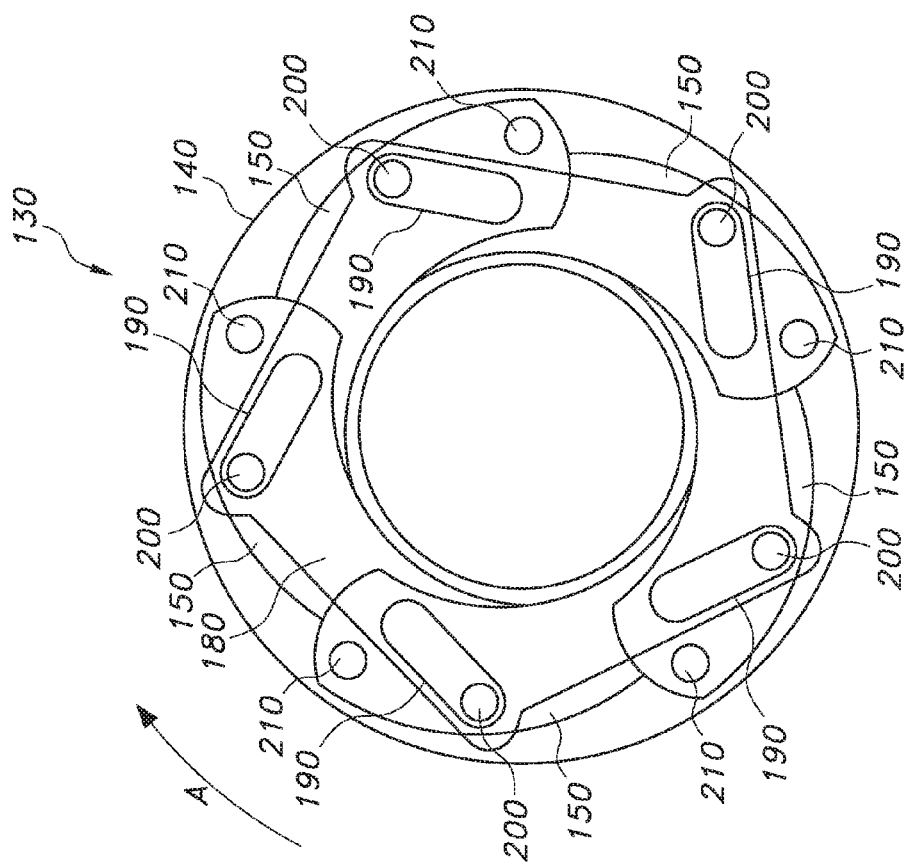
FIG. 3 depicts a bottom view of the power outlet closure of FIG. 2 in an opened configuration.

As shown in FIG. 3, the actuator knob 160 includes an actuator ring 180 which in turn includes a plurality of biasing slots 190. Each biasing slot 190 engages a blade pin 200. In turn, each blade 150 is pivotally attached to the base ring 140 at a pivot point 210. As the actuator knob 160 rotates (arrow A), each blade 150 is biased outwardly by the action of a biasing slot 190 on a blade pin 200. This reveals the actuator knob throughbore, through which a power plug (not shown) may now be inserted.

Figure 4:
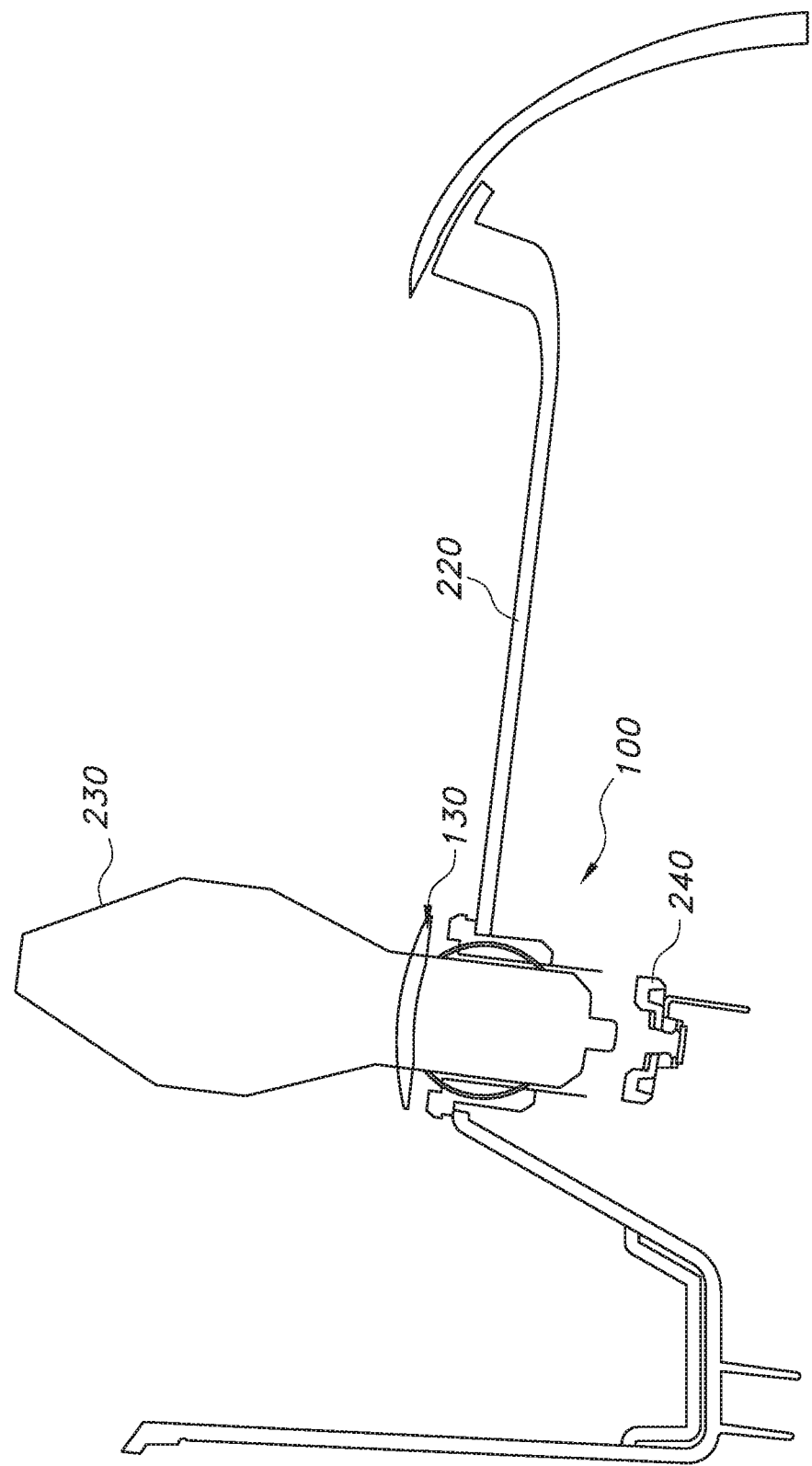
FIG. 4 depicts a side view of the power outlet assembly and closure of FIGS. 1 and 2, placed in a vehicle console and having a power plug inserted therein.

This is illustrated in FIG. 4, showing a substrate 220 which may define a vehicle console, trim panel, or other structure in which a power outlet assembly 100 may conveniently be placed. A power plug 230 is inserted through the power outlet closure 130, which has been placed in the opened configuration shown in FIG. 3 in the manner described above, and advanced until it makes contact with a an electrical contact 240 in electrical communication with a vehicle power source (not visible in this view).

On removal of the power plug 230, as will be appreciated the counteracting force is removed and the biasing members 170 will then bias the power outlet closure blades 150 to the closed configuration shown in FIG. 1. In an alternative embodiment not including the biasing members 170 (not shown), the actuator knob 160 is simply rotated in the opposite direction to manually bias the power outlet closure blades 150 to the closed configuration.

Thus, it will be appreciated that a simple yet effective power outlet configuration is provided for a vehicle, requiring no hinged cap or other structure for preventing a user from inadvertently touching live electrical contact, and also advantageously preventing intrusion of dust, debris, and other harmful substances into the power outlet. Conveniently, the described power outlet is placed in a safe, closed configuration merely by removing a power plug therefrom. Obvious modifications and variations are possible in light of the above teachings. All such modifications and variations are within the scope of the appended claims when interpreted in accordance with the breadth to which they are fairly, legally and equitably entitled.

What is claimed:

1. A power outlet seal for a vehicle, comprising:
   an iris seal; and
   an actuator knob directly connected to the iris seal, said actuator knob configured to translate the iris seal between an opened configuration and a closed configuration.

2. The power outlet seal of claim 1, wherein the iris seal comprises a plurality of blades disposed concentrically on a base ring.

3. The power outlet seal of claim 2, wherein the actuator knob comprises an actuator ring for biasing the plurality of blades to the opened configuration.

4. The power outlet seal of claim 2, further comprising one or more biasing members for biasing the plurality of blades to the closed configuration.

5. The power outlet seal of claim 4, wherein each of the one or more biasing members is a spring wire.

6. A power outlet including the power outlet seal of claim 1.

7. A vehicle including the power outlet of claim 6.

8. A power outlet seal assembly for a vehicle, comprising:
   a power outlet in electrical communication with a vehicle power source; and
   a closure for the power outlet, the closure comprising an iris seal and an actuator knob configured to translate the iris seal between an opened configuration and a closed configuration, said actuator knob directly connected to the iris seal.

9. The assembly of claim 8, wherein the iris seal comprises a plurality of blades disposed concentrically on a base ring.

10. The assembly of claim 9, wherein the actuator knob comprises an actuator ring for biasing the plurality of blades to the opened configuration.

11. The assembly of claim 10, further comprising one or more biasing members for biasing the plurality of blades to the closed configuration.

12. The assembly of claim 11, wherein each of the one or more biasing members is a spring wire.

13. A power outlet including the assembly of claim 8.

14. A vehicle including the power outlet of claim 13.

15. A console or trim piece for a vehicle, comprising:
   a substrate defining at least an opening for a power outlet;
   a power outlet in electrical communication with a vehicle power source; and
   a closure for the power outlet, the closure comprising an iris seal and an actuator knob configured to translate the iris seal between an opened configuration and a closed configuration;
   wherein the iris seal includes a plurality of blades, each of the blades including a blade pin, and wherein actuator knob includes a plurality of biasing slots, each of the plurality of biasing slots adapted to engage a respective blade pin.

16. A vehicle including the console or trim piece of claim 15.

17. The console or trim piece of claim 15, wherein the plurality of blades are disposed concentrically on a base ring.

18. The console or trim piece of claim 17, wherein the actuator knob comprises an actuator ring, the actuator ring comprising the biasing slots for biasing the plurality of blades to the opened configuration.

19. The console or trim piece of claim 18, further comprising one or more biasing members for biasing the plurality of blades to the closed configuration.

20. The console or trim piece of claim 19, wherein each of the one or more biasing members is a spring wire.

* * * * *